July 21, 1953  R. HURTAJ  2,645,898
COMBUSTION CHAMBER HAVING A SERIES
OF EXPANSION CHAMBERS
Filed Sept. 25, 1947  7 Sheets-Sheet 2
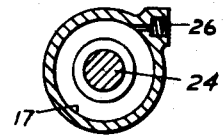
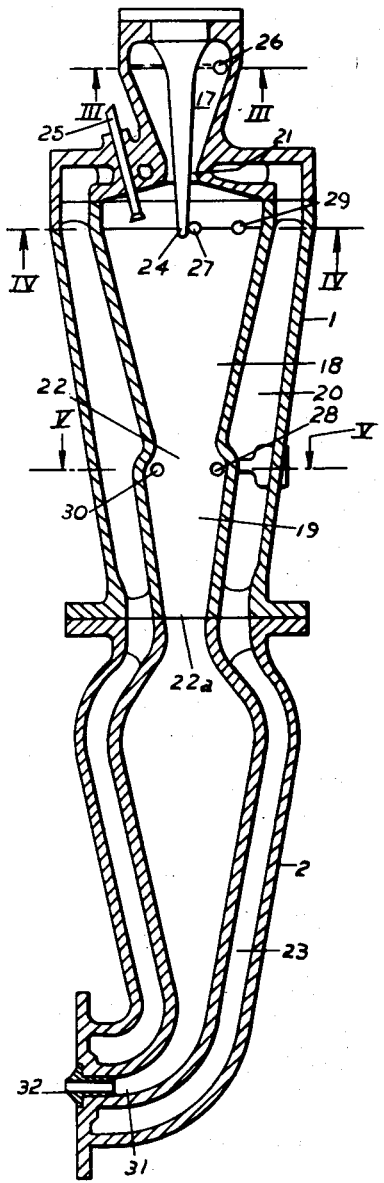
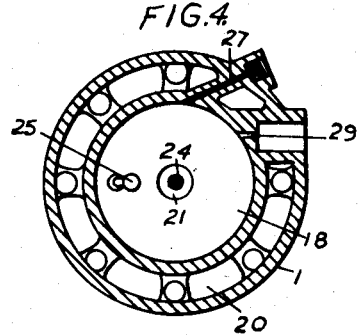
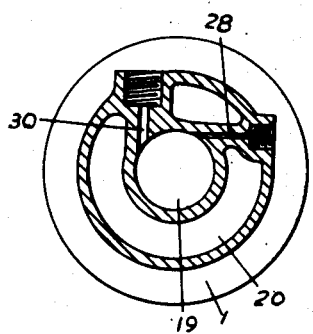
Inventor
ROMUALD HURTAJ
By
Young, Emery & Thompson
Attorneys July 21, 1953 R. HURTAJ 2,645,898
COMBUSTION CHAMBER HAVING A SERIES
OF EXPANSION CHAMBERS
Filed Sept. 25, 1947 7 Sheets-Sheet 4
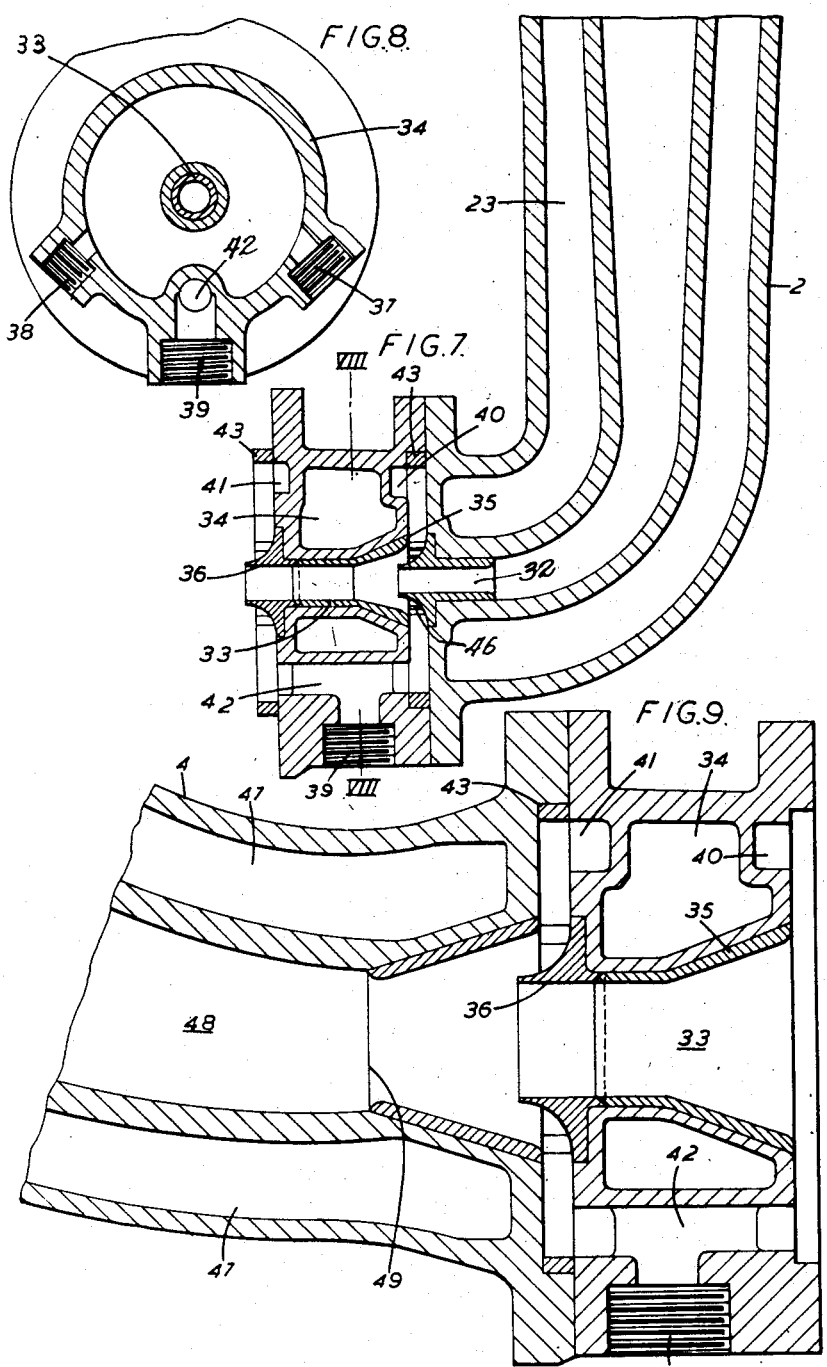
Inventor
Romuald Hurtaj
By
Young, Emery & Thompson
Attorneys

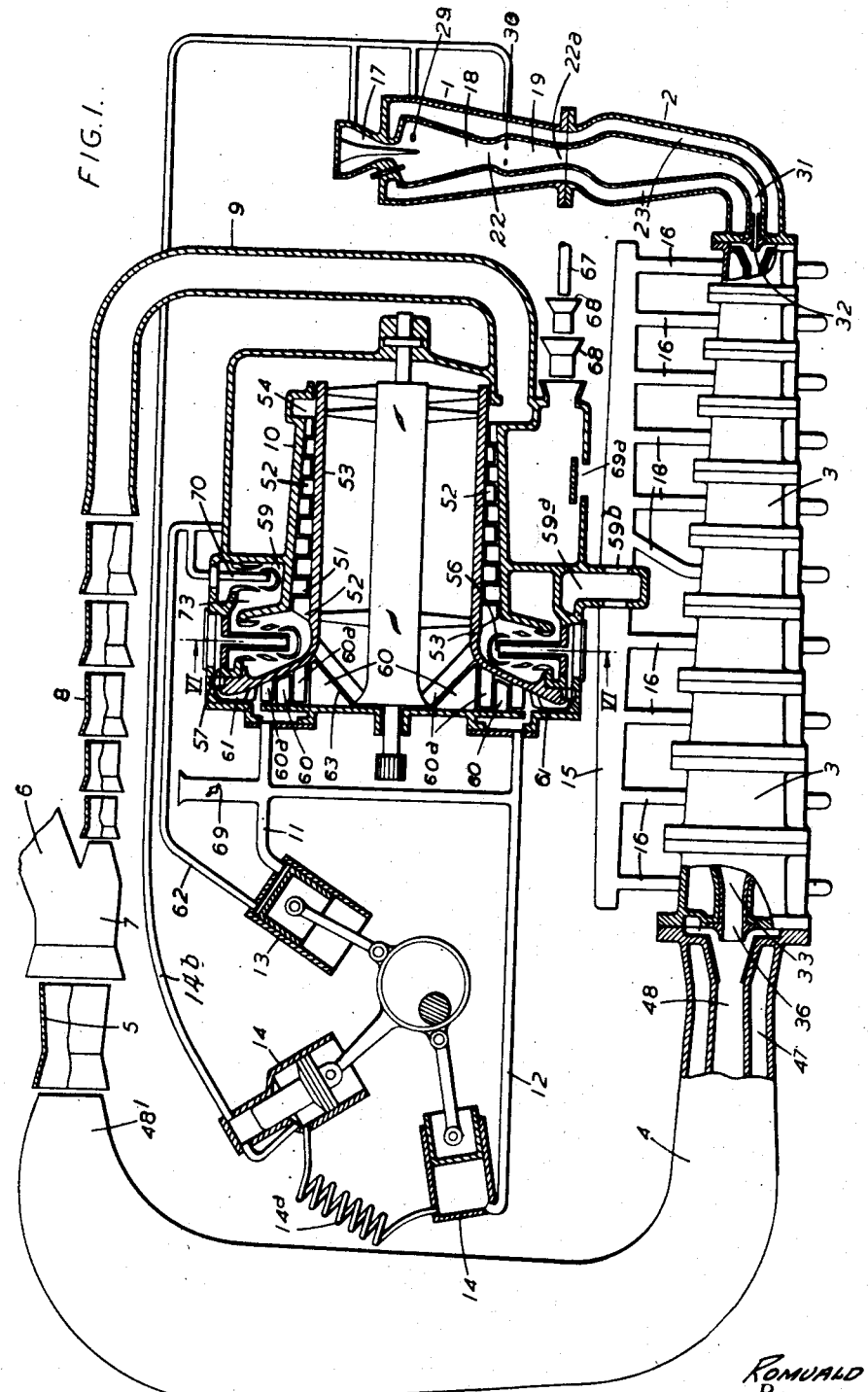

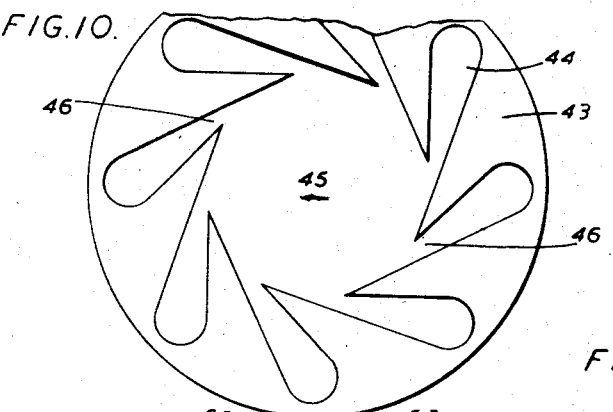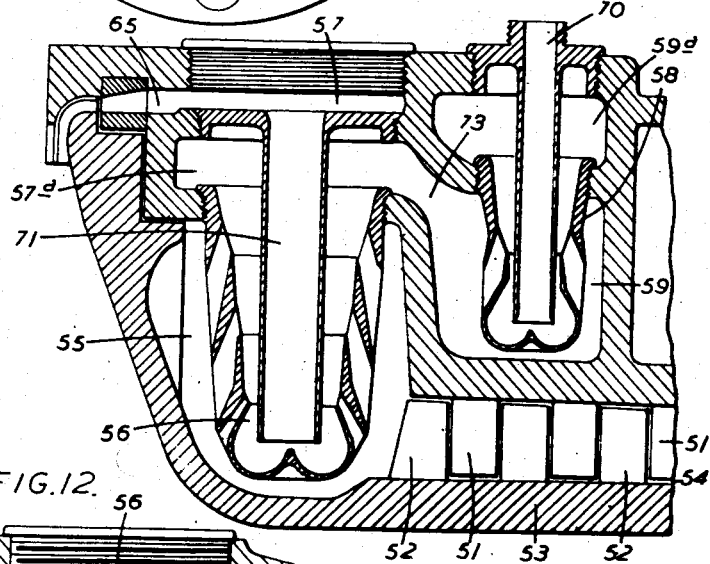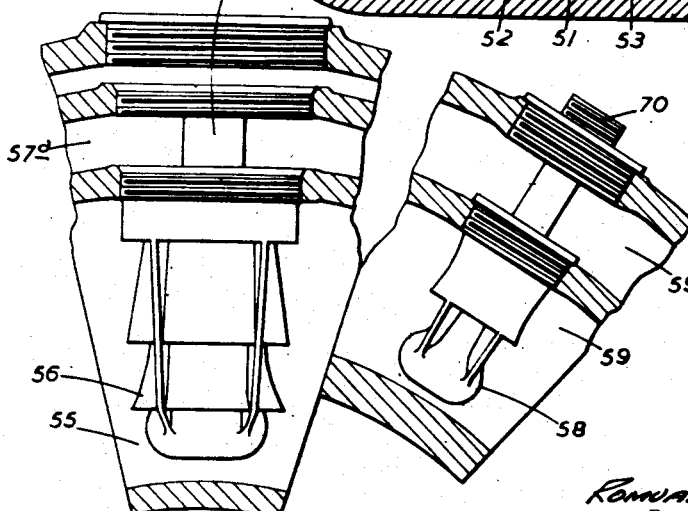

July 21, 1953  R. HURTAJ  2,645,898
COMBUSTION CHAMBER HAVING A SERIES
OF EXPANSION CHAMBERS
Filed Sept. 25, 1947  7 Sheets-Sheet 6
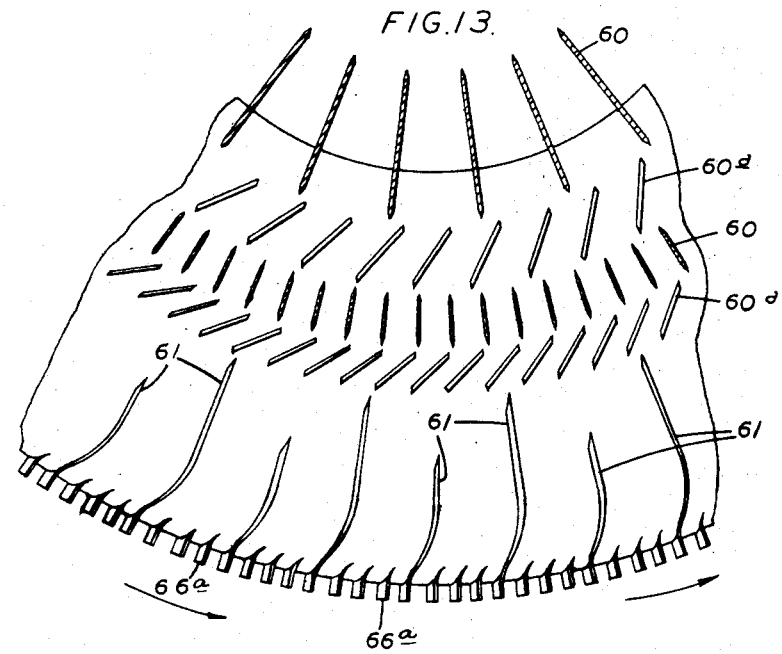
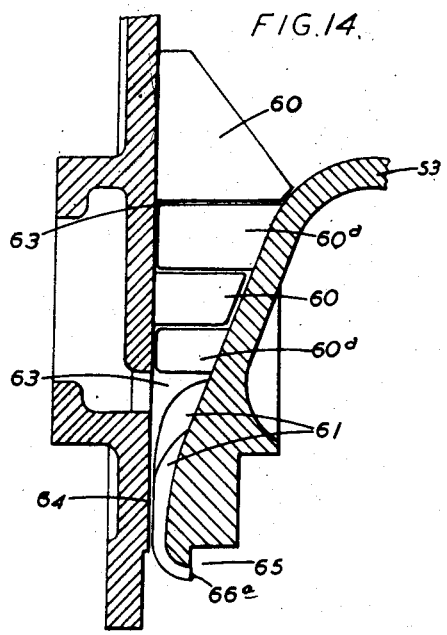
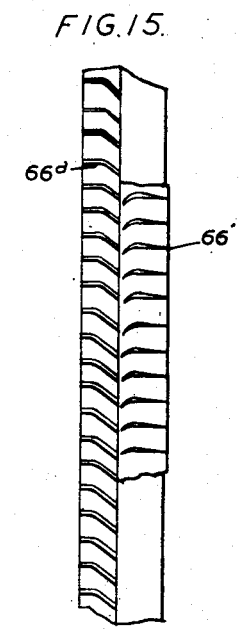
Inventor
Romuald Hurtaj
By
Attorneys

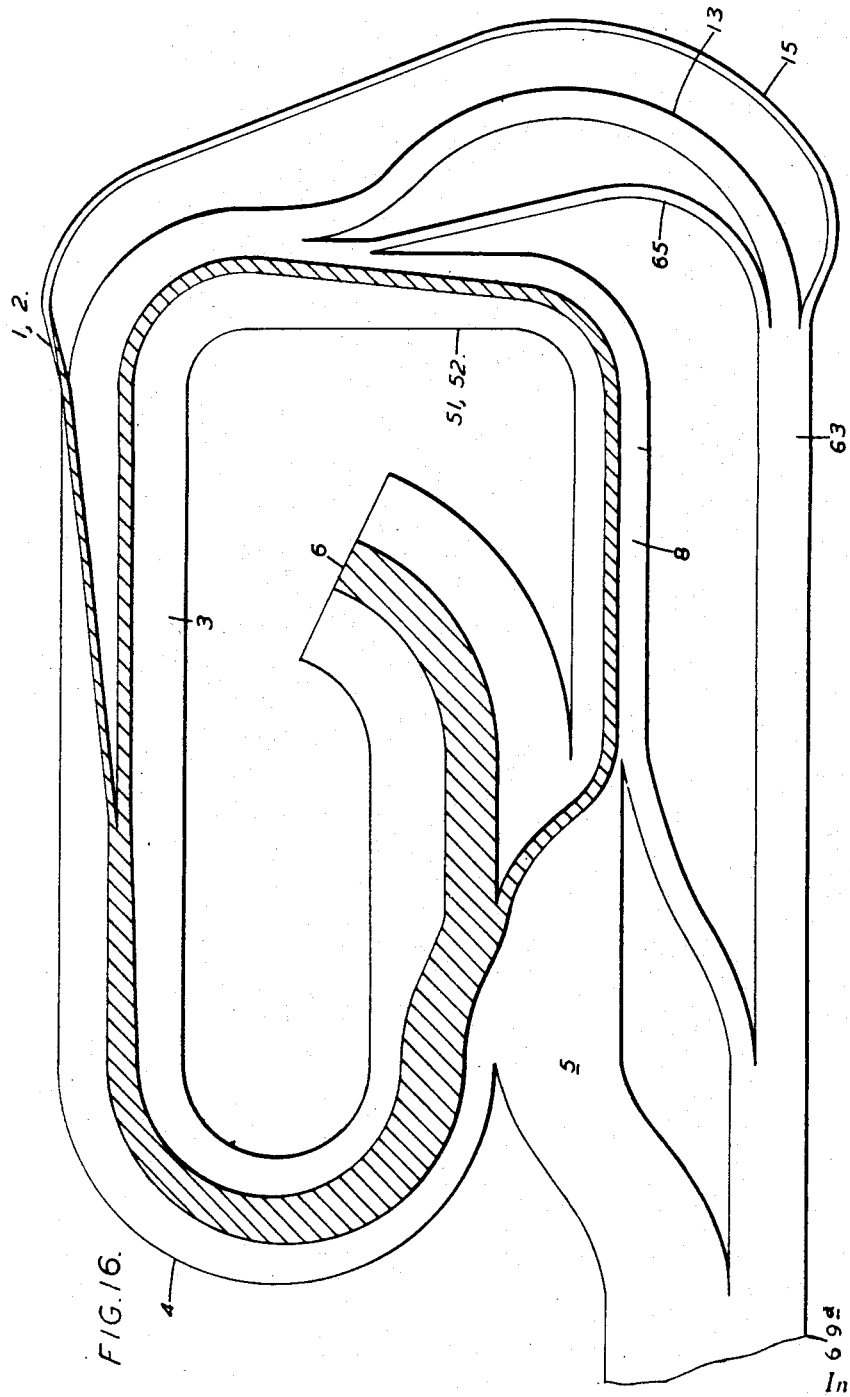

Patented July 21, 1953

2,645,898

UNITED STATES PATENT OFFICE 2,645,898

COMBUSTION CHAMBER HAVING A SERIES OF EXPANSION CHAMBERS

Romuald Hurtaj, London, England

Application September 25, 1947, Serial No. 776,007
In Great Britain June 14, 1946

1 Claim. (Cl. 60—35.6)

The present invention relates to internal combustion engines of the non-compression type, and has for its primary object to provide a modified and improved method of, and apparatus for, producing a burning gaseous medium for discharge from the power jets of so-called jet-propulsion power units.

According to the method of the present invention, fuel is fed into a primary ignition and combustion chamber and is therein heated, and partially atomized and ignited by a stream of flaming gas which is forced through the fuel at high pressure and serves to carry the ignited fuel into a primary vaporizing chamber.

Preferably, the fuel is in the form of a heavy hydrocarbon liquid, and the ignition flame is produced by the ignition of an admixture of air and a lighter hydrocarbon fuel which burns readily and evenly when mixed with air.

According to one feature of the method of the invention, the ignition flame may be produced by spraying liquid fuel into a helically swirling stream of air which is introduced into the primary combustion chamber at high pressure, and then causing the resulting mixture of air and fuel to ignite. Preferably, the fuel is sprayed into the swirling air stream in substantially the same direction as the flow of the air so that the air fuel mixture when ignited is transferred to and located in the vortex of the cooler whirling air stream which acts to protect the walls of the combustion chamber from the heat of the ignition flame.

According to another feature of the method of the invention, a secondary swirling stream of air may be directed against the swirling ignition flame so as to force the latter, or to assist in forcing it, to pass into the main body of atomized heavier fuel. Furthermore, the secondary stream of air assists in spreading the main body of heavy fuel over the surface of the hot wall of the combustion chamber in order that the fuel may be heated in such manner.

According to a further feature of the method of the invention, the main fuel is sprayed into a swirling stream of air which is fed into the primary combustion chamber at high pressure, so that when the main fuel-air mixture is forced by the ignition flame to pass into the vaporizing chamber, it enters the chamber in a swirling heated mass which is flung outwards and disintegrated by centrifugal force so that the liquid fuel is flung against and spread over the inner wall surface of the chamber and is vaporized by the heat of the ignition flame.

According to a further feature of the method of the invention, the vaporized main fuel and the gaseous ignition flame medium are mixed together to form an incandescent gas which may be supplied with additional air in a series of expansion stages in passing from the vaporizing chamber to a main combustion chamber in which the combustion and expansion of the main fuel-air mixture is completed prior to the delivery of the flaming gaseous medium to the power jets of the propulsion unit. It is preferred to impart a further swirling motion to the streams of incandescent gas and additional air as these pass through the air-supplying and expansion stages, so that the relatively lighter incandescent gas stream is maintained in the axial center of the swirling cooler additional air which thus blankets the burning mixture and prevents the latter from damaging the walls of the nozzles in which this step of the method is performed.

According to yet another feature of the method of the invention, a part of the burning gaseous medium, produced as above described, may be used for driving a compressor system which is adapted to supply the compressed air required in the various steps of the method referred to above. The compressor system may include a multi-stage rotary compressor through the turbine chamber of which the burning gaseous medium passes, and from which the medium together with air from the compressor system, is extracted and fed to the incandescent gas stream at the above-mentioned air-supplying and expansion stages.

According to a further feature of the invention, the primary combustion chamber may conveniently comprise three superimposed intercommunicating compartments, each of circular cross section and each entered by an air nozzle or nozzles which is, or are, set substantially tangentially to the wall of the compartment so that air injected from the nozzles at high pressure impinges upon the surface of the said wall and passes round the compartment in a helically swirling stream, while the two lower compartments are each provided with a fuel injection nozzle adapted to spray fuel into the swirling air streams therein.

A constructional form of apparatus for carrying the method of the invention into effect will now be described by way of example and with reference to the accompanying drawings in which:

Fig. 1 is a diagrammatic general arrangement of the apparatus in part section;

Fig. 2 is a sectional elevation of the primary combustion and vaporizing chambers drawn to a larger scale;

Fig. 3 is a cross sectional view taken on line III—III of Fig. 2;

Fig. 4 is a cross sectional view taken on line IV—IV of Fig. 2;

Fig. 5 is a cross sectional view taken on line V—V of Fig. 2;

Fig. 7 is a sectional detail view drawn to a larger scale, of the lower end of the vaporizing chamber and entry end of the air supplying and expansion units;

Fig. 8 is a cross sectional view taken on line VIII—VIII of Fig. 7;

Fig. 9 is a sectional detail view of the discharge end of the final air supplying and expansion unit and the entry end of the main combustion chamber;

Fig. 10 is a face view of the swirl plate shown in Fig. 9;

Fig. 11 is a sectional detail view, drawn to a larger scale, of the ejection devices in the exhaust receivers of the rotary compressor;

Fig. 12 is a view at right angles to Fig. 11;

Fig. 13 is a fragmentary sectional detail view of the rotary compressor vanes, drawn to a larger scale;

Fig. 14 is a fragmentary sectional detail view of the delivery end of the rotary compressor;

Fig. 15 is a fragmentary view of the third stage rotary compressor blades; while Fig. 16 is a diagrammatic development showing the paths taken by the air and gaseous mediums and the volumetric proportions thereof.

Figure 6:
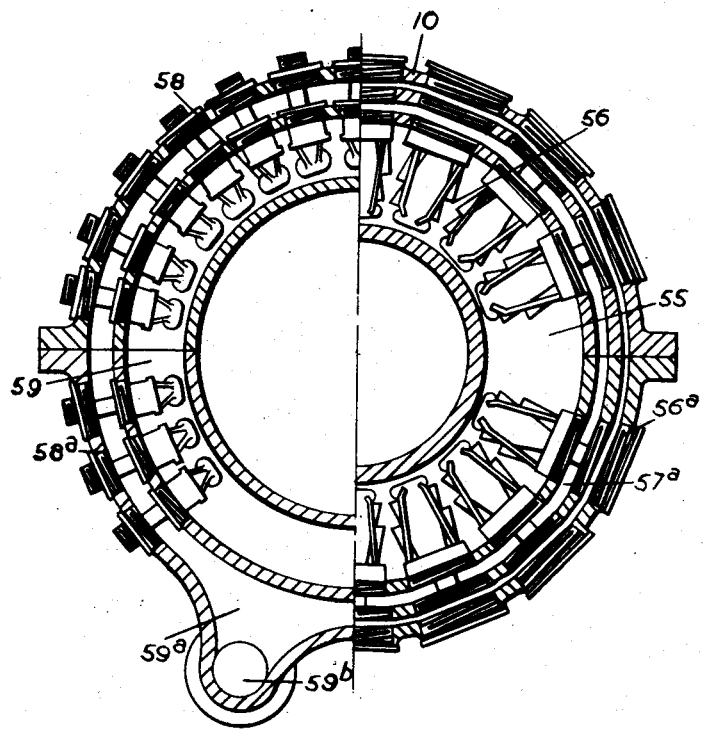
Fig. 6 is a cross section of the rotary air compressor taken on line VI—VI of Fig. 1.

Referring to Fig. 1, the apparatus for carrying the method of the invention into effect comprises a multi-compartment primary combustion chamber 1 set above, and communicating with, a vaporizing chamber 2 which is connected at its lower end to the first of an interconnected series of air supplying and expansion units 3. The final unit 3 of the series is connected to the inlet end of an upwardly extending main combustion chamber 4 in the form of an elongated chamber or duct which is joined at its upper end to a main air cooling temperature reducer 5. A main jet supply duct 6 leads from the reducer 5 to the propulsion power jets (not shown), while a branch duct 7 which also leads from the main reducer 5, is connected to the first of a series of secondary air cooling temperature reducer units 8. A duct 9 connects the final stage of the reducer units 8 to the turbine housing in the casing of a multi-stage rotary compressor 10.

The first stage, compression chamber 63 of the rotary compressor is connected by pipelines 11, 12 to the intake side of a single stage reciprocating compressor 13 and three stage reciprocating compressor 14 respectively, while the delivery side of the compressor 13 is connected by manifold 15 and branch pipes 16 to the air supplying and expansion units 3.

Referring more specifically to Figs. 2–5, the primary combustion chamber 1 is formed with three co-axial, intercommunicating compartments 17, 18 and 19, of circular cross section, which taper towards their lower ends and are joined by throats 21, 22 respectively. The lower compartments 18 and 19 are surrounded by a cooling water-jacket 20 having connections (not shown) to a circulatory system of cooling water.

The lower compartment 19 of the chamber 1 is left open at its lower end, which is flanged for connection to the flanged upper end of the vaporizing chamber 2, the latter being surrounded by a cooling water jacket 23 which opens into the flanged upper end of the chamber and in the construction shown connects with the water jacket 20 of the chamber 1. Alternatively, the water jackets 20, 23 may be separate and connected to different systems of circulating water, if so desired.

The upper compartment 17 of the primary combustion chamber 1 is provided with a central downwardly extending ignition pin 24, the tip of which projects through the throat 21 and into the compartment 18.

An electrically heated ignition plug 25 is passed through the shoulder of the primary compression chamber so as to project into the compartment 18. The plug 25 serves for the initial ignition of the fuel-air mixture in the compartment 18, whereas the pin 24, which is heated by the burning mixture serves to prevent the mixture from becoming inadvertently extinguished during the operation of the apparatus after the ignition plug 25 has been made inoperative.

Air inlet passages 26, 27, 28 are arranged in the wall of the chamber 1 so as to direct streams of air into the compartments 17, 18 and 19 respectively, at a tangent to the circular wall of the chamber, so that the air swirls helically around each compartment.

A light fuel injection jet 29 is provided in the compartment 18 and a heavy fuel injection jet 30 is provided in the compartment 19 for spraying liquid fuel into the swirling streams of air, the jet 29 being shaped to deliver a finely atomized spray, while the jet 30 is adapted to deliver a coarse spray.

The vaporizing chamber 2 is bulbous and tapers downwardly to a restricted opening which is formed into a curved throat 31 provided with a delivery nozzle 32. The delivery end of the vaporizing chamber is flanged for connection to the first of the series of air supplying and expansion units 3.

As shown more clearly in Figs. 7, 8 and 9, the air supplying and expansion units each comprises a central tube or nozzle 33 which is circular in cross section and is surrounded by a circular water cooling jacket 34; the receiving end 35 of the nozzle being flared, and its delivery end formed with a concave nose 36. The water cooling jacket 34 is provided with inlet and outlet ports 37, 38 which are adapted to be connected to a circulatory supply of cooling water.

The flanged end faces of the units 3 are rabbeted and covered by swirl plates 43 to form annular air flow passages 40, 41 which are joined by longitudinal passages 42. The units 3 are provided with air supply ports 39 which enter the passages 42 and are adapted for connection to the air supply pipes 16.

As shown more clearly in Fig. 10, each swirl plate 43 is provided with a series of angularly disposed slots 44 having restricted throats 46, and the alternate edges thereof are set substantially tangential to the periphery of a central opening 45. The inner enlarged ends of the slots 44 are adapted to register with the annular air passages 40, 41 so that the air stream in passing along the slots to the central opening 45 has a helical swirling motion imparted to it. The central openings 45 of the swirl plates register with the flared ends 35 of the nozzles 33, and thus the air is passed through the nozzles in a swirling stream. When the units are assembled in closely abutting relation as shown in Fig. 1, the delivery end or nose 36 of each nozzle 33 lies in the flared end 35 of the nozzle at the adjacent unit, the inwardly radiused noses of the nozzles providing annular air flow passages in the flared ends 35 of the nozzles. The final unit 3 is connected to the flanged intake end of the main combustion chamber 4 as shown in Fig. 9. The chamber 4 is in the form of an elongated conical duct with bent ends 48, 48 and is surrounded by a cooling water jacket 47. The receiving end of the duct 48 is restricted to a comparatively large throat 49 in which lies the delivery end 36 of the nozzle of the final air supplying unit 3.

The main temperature reducer 5 and the secondary reducer 8 each comprises a series of Venturi-type injector nozzles which are adapted to draw air from the atmosphere into the stream of burning gas which passes through the reducers.

Referring to Figs. 1, 6 and 11–15, the rotary compressor is provided with a rotor 53, having turbine blades 52 which co-operate with fixed blades 51 set within the turbine housing 54. The duct 9 is connected to the inlet end of the turbine housing which opens and exhausts into the first stage compartment 55 of an annular exhaust receiver chamber.

A series of Venturi type ejectors 56 are radially disposed in ports 56a around the wall of the exhaust receiver compartment 55 as shown, while a series of similar ejectors 58 are similarly disposed in ports 58a around the wall of the adjacent second stage compartments 59 of the exhaust receiver. The annular chamber 57a into which the ejectors 56 deliver is connected to the receiver chamber 59 through passages 73, while the inlet ends of the ejector nozzles 71 open into an annular passage 57 which communicates with the third stage rotary compressor chamber 65.

The inlet ends of the nozzles 70 of the ejectors 58 are connected to the compressed air supply pipeline 62 leading from the single stage compressor 13, while the annular chamber 59a into which the ejectors 58 deliver the air and exhaust gas ejected thereby is provided with an outlet port 59b (Fig. 6) which leads to the compressed air manifold 15.

The rotary compressor operates in three sections which, as indicated in Figs. 13, 14 and 15, comprise an inner or first stage compressor chamber 63 fitted with radial compressor blades 60, an intermediate or second stage centrifugal compressor chamber 64, and an outer or third stage compressor chamber 65 provided with axial blades 66; the rotor 53 carrying blades 60a, and 66a which interact with the blades 60 and 66 respectively, and blades 61 which rotate in the second stage centrifugal compressor chamber 64.

The first stage of the rotary compressor is also adapted to be used as a starter for the compressor turbine, and to this end auxiliary air at superatmospheric pressure is enjected into the casing of the compressor 10 through pipe line 67 and Venturi injector nozzles 68 and flows in a cooling stream through the turbine rotor to impinge upon the compressor blades 60, 60a (Fig. 1). An air venting valve 69 is provided in the compressor pipeline 11 and means (not shown) are provided for maintaining the valve opened or closed as desired.

In the operation of the above described apparatus, highly compressed air from the three-stage reciprocating compressors 14, which are interconnected through a cooling coil 14a, is delivered over pipeline 14b and through air inlets 26, 27 and 28 to the compartments 17, 18 and 19 of the primary combustion chamber 1 at a pressure of for example 50 atmospheres, which exceeds the normal working pressure of the chamber by approximately 10 atmospheres.

A comparatively light hydro-carbon fuel is sprayed under pressure through jet 29 into the helically swirling stream of air in the middle chamber 18 in the direction of flow of the air stream which latter, in volume, is approximately 100% in excess of the amount required to produce a suitably combustible air fuel mixture. The mixture is then initially ignited by means of the electrically heated incandescent plug 25 and burns continuously to produce a flaming gaseous mass having a temperature of about 700° C. which, as the lighter substance, is forced to the vortex or axis of the comparatively cool swirling air stream so that the latter circulates between the wall of the chamber and the flaming mass. The swirling stream of comparatively cool air in the upper compartment 17 is moved downwards into the compartment 18 through throat 21 by its weight, pressure and rotative movement, and so forces the flaming air-fuel mixture (hereinafter referred to as the ignition flame) into the lower chamber.

The main heavy hydro-carbon fuel has meanwhile been sprayed under pressure into the swirling air stream in the lower chamber 19. The main fuel is injected in the form of a coarse spray through the jet 30 and is flung by the centrifugal force of the whirling air stream injected into compartment 18, and by the descending air stream from compartment 17, against the inner wall of the compartment which becomes heated in operation. The main fuel is thus spread out over the surface of the wall and flows downwards in a heated, partly atomized state towards the restricted lower throat 22 of the chamber. At this point, the fuel is brought into strongly frictional contact with the ignition flame and is thus heated and further atomized as it is forced with the ignition flame through the restricted throat 22a and into the vaporizing chamber 2.

The now hot stream of main fuel and air swirls around the vaporizing chamber at substantially the same pressure as in the primary combustion chamber 1 and flings, by centrifugal force, a shower of the heavier liquid fuel against the inner wall of the chamber 2. The scattered globules of fuel flow down the wall surface and are evaporated by the heat of the ignition flame which has accompanied the main fuel-air stream into the vaporizing chamber, so that by the time the main fuel approaches the lower end of the vaporizing chamber it has been substantially completely evaporated. Due to the presence in the ignition chamber of an excess of air, the light fuel entering said chamber burns quickly, and by the time the ignition flame approaches the lower end of the vaporizing chamber the light fuel has been completely burnt. Thus at the lower end of said vaporizing chamber the temperature falls off considerably, assisted by the cooling medium circulating in the jacket 23 and the fact that there is insufficient air in said lower end zone to support combustion of the vaporized heavy fuel, and may be in the region of 800° C. The vaporized main fuel is forced by the ignition flame in the upper part of the vaporizing chamber and by the superimposed swirling air, to the bent neck 31 at the lower end of said chamber, which creates turbulence in said vaporized fuel, the latter thereafter flowing through the nozzle 32 into the first expansion unit 3, where it ignites spontaneously on meeting the air supplied to said unit from the compressor.

The stream of incandescent gas in passing through the air supplying units 3 receives large additional amounts of air in successive stages of expansion, which additional air is in fact a mixture of air and exhaust gas from the turbine fed to the units from the air compressors by means of the ejectors 56, 58 as above described, and its temperature rises quickly. The stream of gas forces its way at high velocity through the nozzles 33 and meets the air injected through the swirl plates 43, so that the air is first rotated and then imparts a swirling or corkscrew motion to the stream of incandescent gas. The swirling motion described tends to prevent the mixing of the incandescent gaseous streams with the stream of injected comparatively cooler air, so that the cooler air becomes interposed between the walls of the nozzles and the incandescent gaseous stream which is forced to the longitudinal centre of the nozzles. Thus the nozzles are protected from being over heated and burnt by the incandescent gaseous mixture, while the over-rapid combustion of the latter is checked.

The incandescent gaseous stream passes from the final unit 3 into the main combustion chamber 4. The restricted, abruptly bent lower and upper parts 48, 43' of the chamber create turbulence in the swirling stream which causes a more rapid combustion of the gas in the combustible stream which now carries approximately 100% more air than is required for complete combustion of the fuel therein.

The temperature of the incandescent gas in the main combustion chamber is too high for practical use in propulsion power jets or the compressor turbine, and in order to reduce this temperature the stream of gas is passed through the main reducer 5 where it receives approximately a further 200% more cooling air. Thus, the stream of gas contains approximately 300% excess air over the amount required for complete combustion, and is sufficiently cooled for use in air cooled ducts and jets.

In the apparatus described above, it is arranged for approximately 80% of the cooled incandescent gas to flow through duct 6 to the main propulsion jets, while the remaining 20% is further cooled by passage through the reducer jets 8 and is then passed through duct 9 to the turbine of the rotary compressor 10.

The gas passes from the turbine blades 51, 52 to the first-stage compartment 55 of the exhaust receiver and is drawn from the receiver compartment by the ejectors 56 which are operated by compressed air from the third-stage 65 of the rotary compressor. This air mixes with the exhaust gas and is discharged into the second stage compartment 59 of the exhaust receiver from which the mixture of exhaust gas and air is drawn by the ejectors 58. The air from the single stage reciprocating compressor which operates the second stage ejectors 58 through the nozzles 70 mixes with the extracted gas and air and the mixture is fed through chamber 59a and outlet port 59b to the manifold 15 and through branch pipes 16 to the air supplying units 3. The mixture of air and gas thus produced contains no more than a very small percentage of exhaust gas and therefore will not deleteriously affect the combustion of the incandescent gas stream into which it is fed.

In the operation of the air compressor system the valve 69 is opened to atmosphere prior to using the auxiliary compressed air from pipeline 67 for starting the turbine. During the running of the rotary compressor, the valve 69 is closed to atmosphere and the air drawn into the compressor casing from atmosphere through the nozzles 68 and if required through an additional valve 69a. The air is circulated through the compressor casing and rotor 53 and then extracted from the first-stage compression chamber 63 by both reciprocating compressors 13, 14 over pipelines 11 and 12 respectively, and also by the second-stage centrifugal compressor which passes the air to the third-stage compression chamber 65 from which the compressed air is supplied to the first stage ejectors 56 operating in the turbine exhaust gas receiver.

The single stage reciprocating compressor 13 which takes the larger part of the compressed air from the first-stage of the rotary compressor, is preferably arranged to supply the air to the exhaust receiver second-stage ejectors 58 at a pressure higher than that of the air delivered from the third stage of the rotary compressor.

Fig. 16 shows purely as a diagrammatic development, the relative proportions by volume of the combustible gas and additional air contained in the system as the method of the invention is carried into effect. The references applied to this diagram correspond to the relevant parts of the mechanism described above, while the shaded parts of the system represent the volumes of the combustible gas or exhaust from such gas, and the plain portions of the system indicate comparative volumes of air which co-operate or are admixed with the gas.

It will be understood that the relative percentages of air and combustible gas are given in the above description merely by way of example and are not to be regarded as in any way limitative to the possible modifications and variations in carrying the invention into effect.

I claim:

In apparatus for the production of a burning gaseous medium for discharge from the jets of a jet propulsion unit, a gas generating chamber, means for maintaining within said chamber a helically swirling stream of air at high pressure, means for maintaining an ignition flame extending through said air stream axially of said chamber, means for injecting liquid fuel into the air stream in the same helical direction as said air stream whereby it is atomized by its contact with the air, and whereby a part of said atomized fuel is spread centrifugally over the wall of the generating chamber so as to be heated and vapourized by its contact therewith while another part of said atomized fuel is vapourized and ignited by said ignition flame, a combustion chamber comprising a series of axially aligned expansion chambers each having an axial flow path of circular cross section, means for supplying air from a common source concurrently to all of said expansion chambers, each of said expansion chambers comprising a passage extending axially therethrough of a cross section varying from the inlet to the outlet ends thereof and with the outlet end of one chamber projecting into but radially spaced from the inlet end of the adjacent chamber, a swirl plate having a central opening mounted on the outlet end of each chamber, each swirl plate having a plurality of slots positioned tangentially with respect to the central opening, each of said slots having a constricted discharge orifice opening into the central opening for directing the flow of air in a swirling manner into the axial passage of the chambers, means for introducing a burning mixture of air, combustion gases and fuel vapour from said gas generating chamber into said series of expansion chambers for flow therethrough, and means for cooling the products of combustion before they are conveyed to the jets of the propulsion unit.

ROMUALD HURTAJ.

References Cited in the file of this patent

UNITED STATES PATENTS

| Number | Name | Date |
|---|---|---|
| 559,894 | House | May 12, 1896 |
| 690,486 | Tomlinson | Jan. 7, 1902 |
| 976,221 | Scrimgeour | Nov. 22, 1910 |
| 1,069,694 | Hayot | Aug. 12, 1913 |
| 1,163,650 | Fogler | Dec. 14, 1915 |
| 1,757,855 | Chilowsky | May 6, 1930 |
| 1,777,411 | Mayr | Oct. 7, 1930 |
| 1,987,400 | Hillhouse | Jan. 8, 1935 |
| 1,987,401 | Hillhouse | Jan. 8, 1935 |
| 2,033,010 | Russell | Mar. 3, 1936 |
| 2,059,523 | Hepburn et al. | Nov. 3, 1936 |
| 2,097,255 | Saha | Oct. 26, 1937 |
| 2,115,634 | Kiesel | Apr. 26, 1938 |
| 2,303,381 | New | Dec. 1, 1942 |
| 2,579,614 | Ray | Dec. 25, 1951 |

FOREIGN PATENTS

| Number | Country | Date |
|---|---|---|
| 517,894 | France | Dec. 23, 1920 |
| 522,163 | France | Mar. 22, 1921 |
| 799,258 | France | Mar. 27, 1936 |